(No Model.)
B. F. THOMPSON.
FRUIT PICKER.
No. 576,630.                    Patented Feb. 9, 1897.
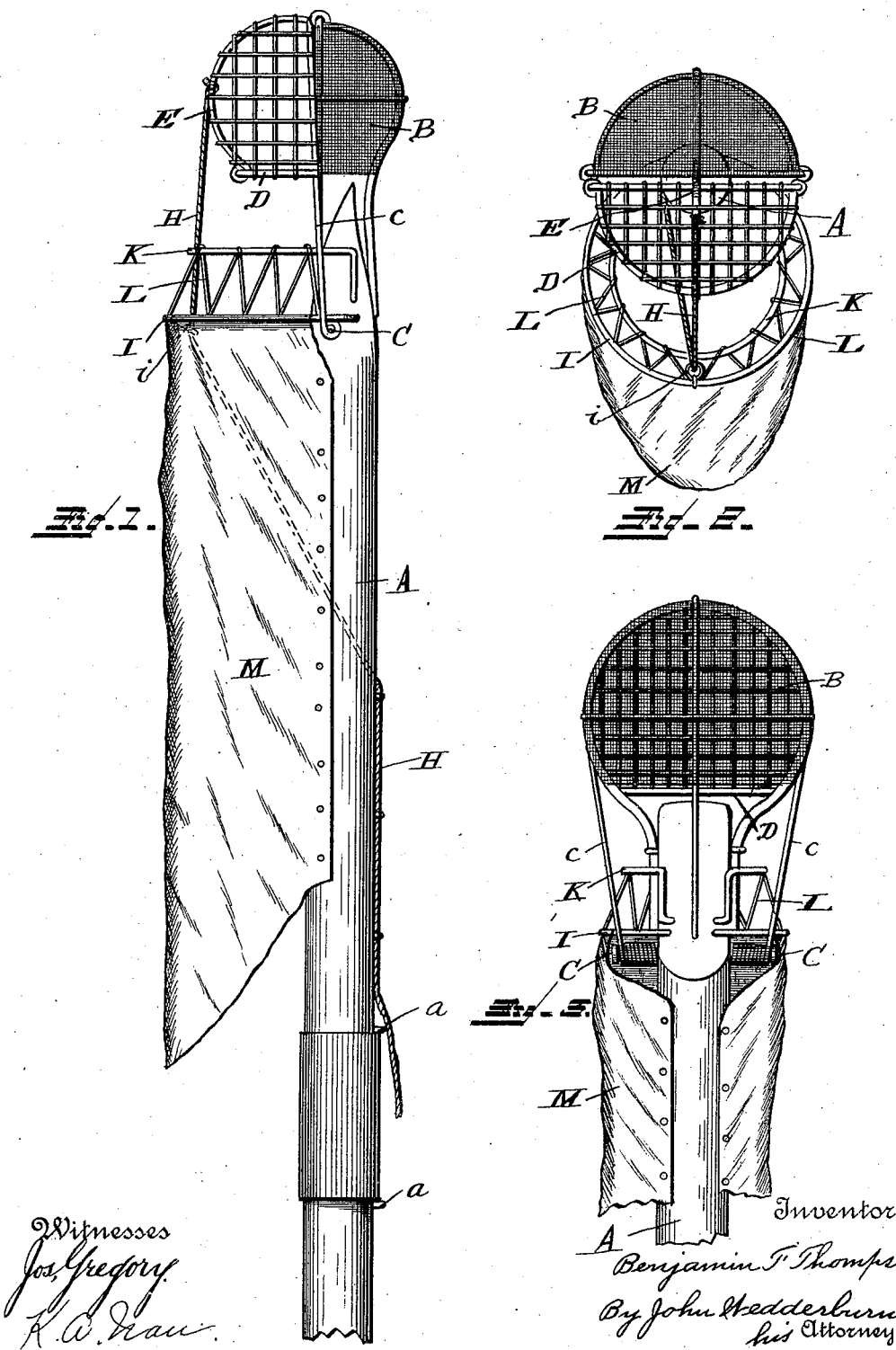

UNITED STATES PATENT OFFICE.

BENJAMIN F. THOMPSON, OF FRITTS, VIRGINIA.

FRUIT-PICKER.

SPECIFICATION forming part of Letters Patent No. 576,630, dated February 9, 1897.

Application filed March 30, 1896. Serial No. 585,309. (No model.)

*To all whom it may concern:*

Be it known that I, BENJAMIN F. THOMPSON, a citizen of the United States, residing at Fritts, in the county of Lee and State of Virginia, have invented certain new and useful Improvements in Fruit-Pickers; and I do hereby declare the following to be a full, clear, and exact description of the invention, such as will enable others skilled in the art to which it appertains to make and use the same.

This invention relates to certain new and useful improvements in fruit-pickers; and it has for its object to provide a simple cheap portable fruit-picker which can be readily and conveniently placed in any desired position among the boughs or limbs of the trees to pick the fruit and by which the fruit will be quickly and easily gathered without injury thereto and allowed to drop through a chute into a basket or other receptacle provided therefor. I provide an adjustable pole, so that the device may be used conveniently for greater or less heights.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is an elevation of my improved fruit-picker. Fig. 2 is a plan. Fig. 3 is a view at right angles to Fig. 1.

Like letters of reference indicate like parts in the various views.

Referring now to the details of the drawings by letter, A designates a pole or rod or support, which may be of any desired size, material, and length, being made extensible, so as to adapt it for use in picking fruit close to the ground or at greater heights. To the upper end of this pole is attached the stationary or fixed jaw B, composed of wire, as shown, and having the shank thereof firmly secured to the end of the pole. Extending from opposite sides of the pole beyond the point of connection of the stationary jaw, which latter is preferably basket or cup shaped, are the two sections or rods C, which serve as the pivots on which the movable jaw works. This movable jaw is composed of the wire c, bent as shown and having its ends coiled around the said projecting pins and then secured in opposite sides of the pole, thus forming an integral spring-pivoted device which serves to normally keep the jaw in its closed position. To the main wire of this jaw is secured the wire D, and the wire E connects the same at its center with the center of the arch of the said wire C. Cords or wires or netting may be arranged upon this movable jaw to hold the fruit and prevent injury thereto. It will be observed that the lower side of this jaw is open, so that as it is moved away from the stationary jaw after the fruit has been picked the fruit can readily fall down through this opening into the sack or chute.

The movable jaw is adapted to be operated by a cord or wire H, secured to the wire E thereof and to any convenient point and passing down through suitable guides or staples on the pole and on the supporting-wire of the sack, reaching to within convenient reach of the operator.

I is the supporting-wire for the upper end of the sack. It is bowed, as shown, and has its ends secured to the pole, the ring or guide *i* being secured thereto, and through which the operating-cord passes.

K is another wire arranged above the wire to which the sack is attached, and is of less diameter and is secured to the pole in any suitable manner. Cords or wires L connect this wire with that which supports the sack, and the said wire serves as a stop to limit the downward movement of the movable jaw and, being resilient, forms a sort of a cushion therefor, so as to prevent injury to the picker in case the movable jaw is pulled down too hard. This wire may be omitted.

M is the sack, of canvas or other suitable material, secured to the supporting-wire and to the opposite sides of the pole, and down this the fruit is designed to fall into a basket or other receptacle after it has been picked.

Modifications in details may be resorted to without departing from the spirit of the invention or sacrificing any of its advantages.

The two main wires of both cups or jaws may sometimes be inserted into a rubber tube and the end of the pole also covered with rubber or some soft material, so as not to bruise the fruit in picking. The stationary cup may, if desired, be so arranged as to spring back a little by means of a wire or trigger worked by the same cord that opens the movable jaw.

Having thus described the invention, what is claimed as new is—

1. The combination with the rod or pole and the stationary jaw, of a movable jaw having its supporting-frame extended and coiled around pins projecting from opposite sides of the pole to constitute a spring-pivot, said movable jaw being open upon its under side, and a sack having its mouth located beneath the open under side of said jaw, and a spring-wire ring above the upper end of the sack to form a stop for the movable jaw, substantially as described.

2. The combination with the rod or pole and the stationary jaw, of a movable jaw having its supporting-frame extended and coiled around pins projecting from opposite sides of the pole to constitute a spring-pivot, said movable jaw being open upon its under side, and a sack having its mouth located beneath the open under side of said jaw, and a spring-wire ring above the upper end of the sack to form a stop for the movable jaw, and cords connecting said spring-wire ring with the supporting-ring of the sack, substantially as described.

In testimony whereof I have signed this specification in the presence of two subscribing witnesses.

BENJAMIN F. THOMPSON.

Witnesses:
J. F. WITT,
C. W. ALLEN.